Dec. 27, 1960 P. D. WENZEL 2,966,220
TRACTOR MOUNTED CULTIVATOR
Filed March 18, 1958 2 Sheets-Sheet 1

INVENTOR:
PHILIP D. WENZEL
BY:
Emerson B Donnell
ATTORNEY

Dec. 27, 1960 P. D. WENZEL 2,966,220
TRACTOR MOUNTED CULTIVATOR
Filed March 18, 1958 2 Sheets-Sheet 2
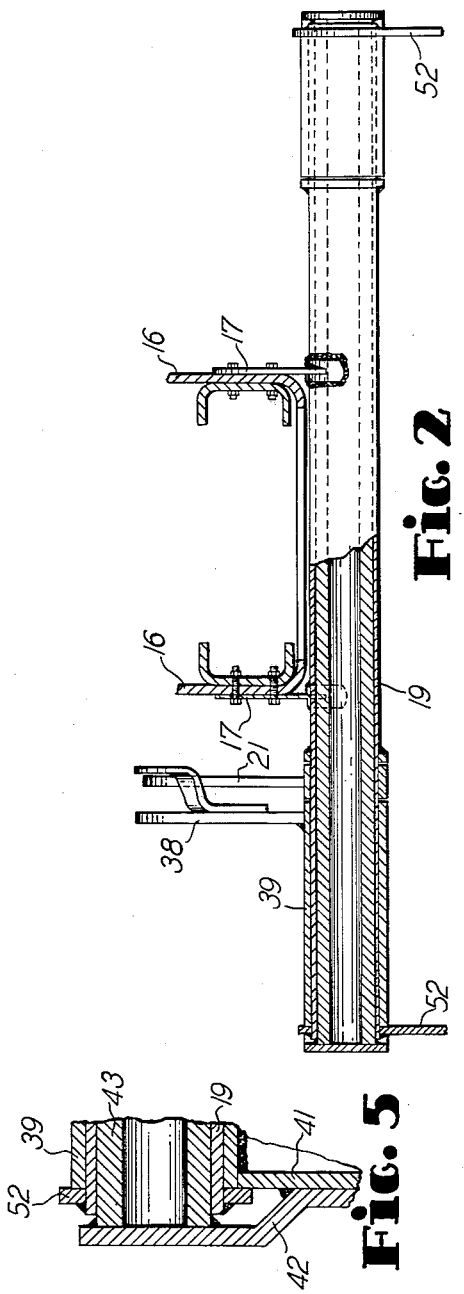
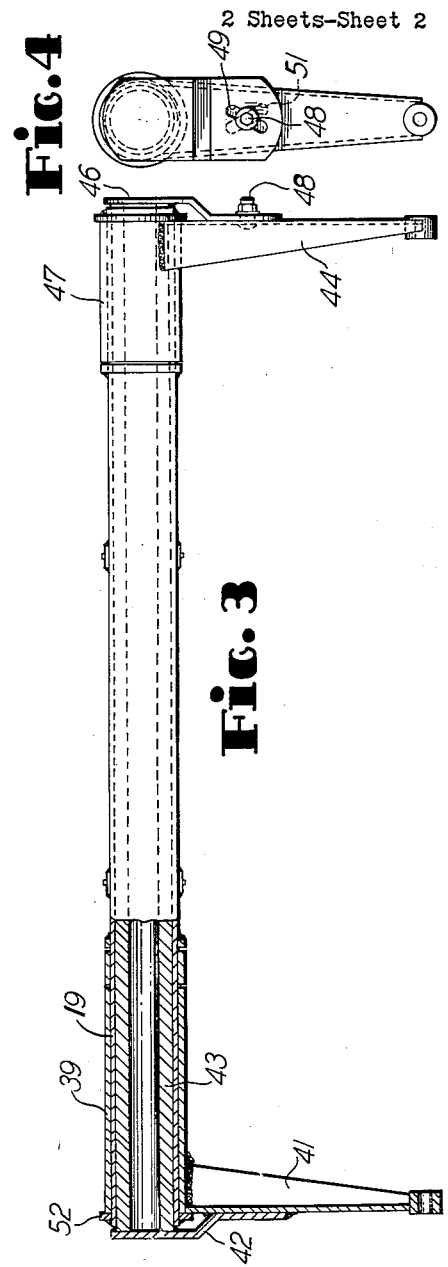
INVENTOR:
PHILIP D. WENZEL
BY:
Emerson B Donnell
ATTORNEY United States Patent Office 2,966,220
Patented Dec. 27, 1960

2,966,220

TRACTOR MOUNTED CULTIVATOR

Philip D. Wenzel, Stockton, Calif., assignor to J. I. Case Company, Racine, Wis., a corporation of Wisconsin Filed Mar. 18, 1958, Ser. No. 722,305

10 Claims. (Cl. 172—307)

This invention relates to a tractor mounted cultivator and, more particularly, it relates to a means for raising and lowering the cultivator so that the same may be placed in pre-selected upper and lower positions.

It is a general object of this invention to provide a means for mounting a cultivator on a tractor wherein the cultivator gangs on opposite sides of the tractor can be raised and lowered in unison, with the cultivator being mounted in an improved manner.

Another object of this invention is to provide a tractor mounted cultivator which is operable by a hydraulic cylinder and wherein the cultivators are resiliently urged into cultivating positions so that they can yield under excessive pressure, or the gage wheel can rise, and thereby avoid damage to the cultivator.

Still another object of this invention is to provide a tractor mounted cultivator which is raised and lowered by hydraulic mechanism wherein the mechanism is automatically governed so that the elevation of the raised and lowered positions is automatically and predeterminately set.

A further object is to provide a single beam for mounting cultivators on opposite sides of a tractor and wherein the elevation of the cultivators on one side of the tractor can be adjusted with respect to the elevation of the cultivators on the opposite side of the tractor (Fig. 4).

Other objects and advantages will become apparent upon reading the following description in conjunction with the accompanying drawings, wherein:

Fig. 2 is an enlarged front elevational view of certain parts of the embodiment, with parts broken away and showing part of the tractor.

Fig. 3 is a projected view of Fig. 2, and having parts thereof removed and others broken away.

Fig. 4 is a right side elevational view of the structure shown in Fig. 3.

Fig. 5 is an enlarged view of one end of Fig. 3.

The same reference numerals refer to the same parts throughout the several views.

Figure 1:
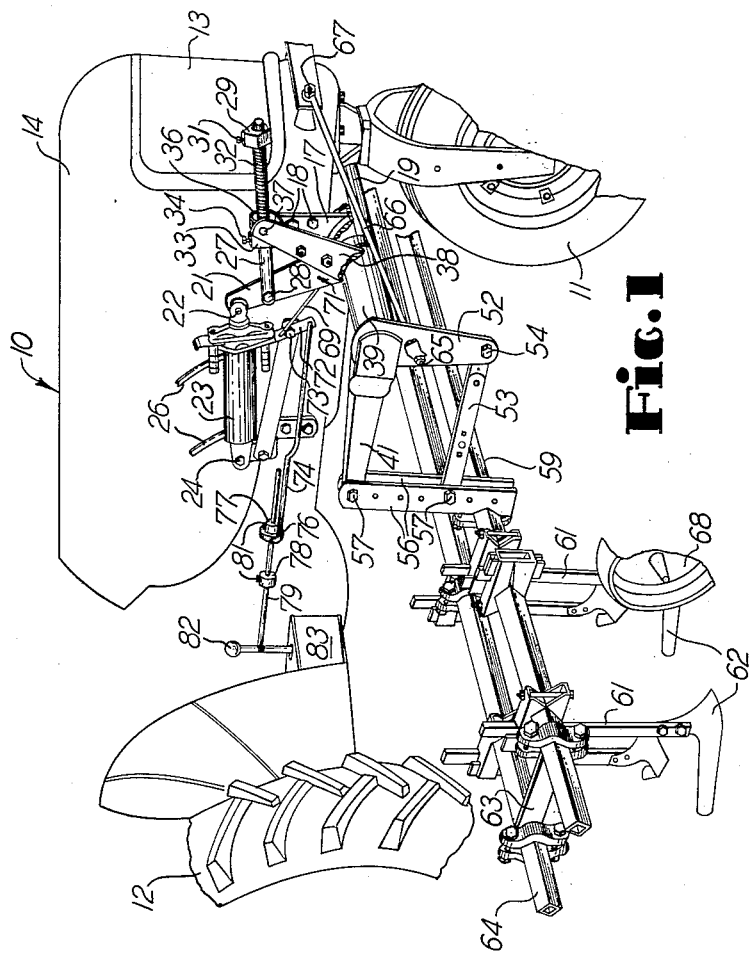
Fig. 1 is a front perspective view of a cultivator incorporating a preferred embodiment of this invention shown mounted on a tractor, with only a fragment of the cultivator and tractor being shown.

Fig. 1 shows a generally conventional tractor 10 wherein a fragment of the single front wheel 11 is shown along with the fragment of the right rear wheel 12 of the tractor. The usual tractor grille 13 and hood 14 are also shown along with the side 16 which is termed the tractor frame. A mounting bracket 17 is secured to the frame by means of bolts 18, and the bracket depends from the tractor to support a tube or beam 19 transverse to the fore-and-aft axis of the tractor with the beam supported in a fixed position with respect to the tractor and extending to both sides of the tractor. Fig. 2 shows that each side of the tractor has a plate or bracket 17, and it will thus also be understood that while only the right side of the tractor in Fig. 1 is shown to have cultivators, the left side of the tractor is also supplied with cultivators. Fig. 2 further shows that the beam 19 extends across the tractor, as mentioned, and a pivot arm 21 is rotatably mounted on the beam 19 with the upper end of the arm 21 being pinned to a hydraulic ram 22 which is extensible from a hydraulic cylinder 23 anchored on the tractor. A bolt 24 is shown to provide the anchor for the cylinder 23 so that, of course, the cylinder is pivotal on the tractor as the ram 22 is axially extended and retracted with respect to the cylinder 23. The usual hydraulic hose connections 26 are fragmentarily shown, and it will be understood that they are attached to opposite ends of the cylinder 23 so that the latter is double-acting in the usual manner. A push rod 27 is pivotally attached by a bolt 28 to the arm 21, and the rod extends forward of the tractor to where a spring adjusting collar 29 is adjustably disposed by means of a set screw 31 on the forward end of the rod 27. A compression coil spring 32 is disposed about the rod 27 to extend from the collar 29 toward a lift adjusting collar 33, and the latter is also adjustable along the length of the rod 27 by virtue of a set screw 34. A trunnion or sleeve member 36 is mounted to slide on the rod 27, and includes a trunnion pin 37 which connects the trunnion member to a lift arm 38. Thus, the spring 32 is disposed between the collar 29 and the trunnion or sleeve member 36, and the latter normally abuts the rear collar 33 under the loading of the spring 32. The arm 38 is welded to a sleeve 39 which is telescoped about the beam 19, as best shown in Fig. 2. It will be understood that the sleeve 39 is rotatable on the beam 19 so that axial displacement of the ram 22 axially displaces the push rod 27 to rotate the lift arm 38 and correspondingly rotate the sleeve 39.

Figs. 3 and 5 show a carrier or lift arm 41 welded to the sleeve 39 to rotate therewith upon actuation of the cylinder, as described. Also, a bracket or connector 42 is welded to the arm 41 and also to an inner torque withstanding member or tube 43 which extends across the tractor for substantially the same length as the tube or beam 19. Thus, the arm 41 when swung by rotation of sleeve 39 rotates the torque tube 43, and it will be seen in Fig. 3 that both ends of the tube 43 are provided with arms so that the opposite end of the tube has an arm 44 adjustably secured to the end of the tube 43 so that rotation of the latter likewise rotates the arm 44 through a bracket 46, which is the part actually welded to the tube 43. The arm 44 is rotatably supported on the beam 19 by means of a sleeve 47 to which the arm 44 is welded, as shown. It will also be seen that the arm 44 and the bracket 46 are not welded together at this end of the beam, but rather they are secured by means of a bolt 48 passing through a slot 49 diagonally disposed in the bracket 46 and the slot 51 which is diagonally disposed in the opposite direction in the arm 44. With this arrangement, the angular or rotational positioning of the bracket 46 with the torque tube 43 can be adjusted with respect to the rotational position of the arm 44, and the two parts can then, of course, be locked in the adjusted position by means of the bolt 48. Thus, the elevation of the cultivators on one side of the tractor can be adjusted with respect to the elevation of the cultivators on the other side of the tractor.

The draft arm 52 is welded to the stationary beam 19 to be maintained in the upright position shown in Fig. 1, and the lower end of the arm 52 connects to a draft link 53 by means of a pivot bolt 54. The rear end of the arm 41 and the link 53 support lift links 56 through pivot bolts 57, and the lower ends of the links 56 are clamped to a front tool bar 59 which is thus horizontally disposed across and underneath the tractor 10, as shown in Fig. 1. Tool standards 61 also clamp to the tool bar 59, and cultivators 62 are attached to the lower ends of the standards 61 to engage the ground in the usual manner during forward motion of the tractor. Also, spacer clamps, such as 63, are rigidly attached between the forward tool bar 59 and a rearward tool bar 64 so that, upon up and down motion of the tool bar 59, the rear tool bar 64 is similarly displaced. A truss rod 66 has one end attached to the tractor at a bolt 67, and the other end 65 attached to the arm 52 so that the latter is further supported in its fixed position. Thus, the arms 41 and 52 and links 53 and 56 form a parallelogram and are retained in this relation during the rotation of the parts as described, and in this manner the tool bars 59 and 64 retain their relative level position with respect to each other as the bars are raised, and thus the cultivator standards 61, along with the cultivators 62, are raised in their upright position so that they are raised and lowered in their respective positions parallel to the ground, and both the front and rear gangs of cultivators will be level regardless of their elevation. Gage wheels as 68 can also be supported on the standards 61.

Fig. 1 also shows a rod 69 pivotally connected by its end 71 to the arm 21 while the opposite end of the rod 69 is connected to a lever 72 which is pivoted to the tractor by means of a bolt 73 so that the lever 72 can pivot about the bolt 73. The lower end of the lever has a rod 74 pivotally attached thereto, and the rod extends rearwardly of the tractor and has an eyelet 76 which is disposed between two stops 77 and 78 on a rod 79. The stops are adjustable along the rod 79 by means of the set screws 81, and the rear end of the rod 79 engages a lever 82 which controls a valve 83. The valve 83 is a conventional hydraulic valve which controls the cylinder 23 so that, for instance, when the lever is moved toward the front of the tractor, the rod 79 is similarly displaced, and the rear stop collar 78 approaches the eyelet 76, but subsequently the latter is displaced rearwardly by the action of the cylinder 23 and the linkage shown and described. The eyelet 76 then engages the collar 78 to return the lever 82 to its upright or neutral position which places the valve 83 in a holding position. Thus, the operator need not be concerned about controlling the valve 83 to obtain the exact raised or lowered positions desired of the cultivators 62. Positioning of the collars 77 and 78 along the rod 79 will result in automatic control of the valve 83. The arrangement between the rods is a lost motion connection.

Also, if gage wheels 68 are employed, or when the cultivators 61 encounter excessive resistance, the links 56 might be raised to rotate the arm 38 against the spring 32. Because of the spring 32, the cultivator is resilient in operation to avoid damage to the parts.

While a specific embodiment of this invention has been shown and described, it should be obvious that certain changes could be made therein, and the scope of this invention should, therefore, be limited only by the appended claims.

What is claimed is:

1. A tractor mounted cultivator comprising a tubular beam attached to said tractor and extending transverse thereto, a sleeve rotatably telescoped over each end of said beam, a lift arm attached to each said sleeve for rotation therewith, a torque tube telescoped inside said beam and being rotatable therewithin and being connected to each said sleeve for transmitting the rotation of one to the other, a lift link attached to each said lift arm for movement therewith, a tool bar attached to each said lift link and disposed parallel to said beam, cultivators attached in upright positions to said tool bar, a stationary arm attached to said beam adjacent each said lift link, a draft link connected between each said stationary arm and said lift link and forming a parallelogram with said lift arm and said stationary arm and said lift link for maintaining said cultivators in upright positions while raising and lowering the same, and means connected to said one of said sleeves for rotating the latter to raise and lower said cultivators.

2. A tractor mounted cultivator comprising a tubular beam attached to said tractor and extending transversely thereto, a sleeve rotatably telescoped about each end of said beam, a lift arm attached to each sleeve for rotation therewith, a torque withstanding member telescoped inside said beam and rotatable therein said torque withstanding member being connected to each sleeve for transmitting the rotation of one sleeve to the other, a lift link attached to each lift arm for movement therewith, a tool bar attached to both lift links and disposed substantially parallel to said beam, cultivators attached in upright positions to said tool bar, a hydraulic motor connected to one of said sleeves for rotating the latter, a valve for controlling pressure in said hydraulic motor, a lever for actuating said valve, and control means connected between said lever and one of said sleeves for transmitting the rotation of the latter to said lever for governing said motor.

3. A tractor mounted cultivator comprising a tubular beam attached to said tractor and extending transverse thereto to project on opposite sides of said tractor, a sleeve rotatably telescoped over each end of said beam, a lift arm attached to each said sleeve for rotation therewith, a torque tube telescoped inside said beam and being rotatable therewithin and being connected to each said sleeve for transmitting the rotation of one to the other, cultivators supported by each said lift arm on opposite sides of said tractor for raising and lowering movement upon rotation of each said sleeve, and means connected to said one of said sleeves for rotating the latter and said torque tube to raise and lower said cultivators on opposite sides of said tractor.

4. A tractor mounted cultivator comprising a tubular beam attached to said tractor and extending transverse thereto to project on opposite sides of said tractor, a sleeve rotatably telescoped over each end of said beam, a lift arm attached to each said sleeve for rotation therewith and projecting rearward of said tractor from said sleeve, a torque tube telescoped inside said beam and being rotatable therewithin and being connected to each said sleeve for transmitting the rotation of one to the other, cultivators connected to each said lift arm and disposed in trailing positions with respect to said beam and forward motion of said tractor, a second arm connected to one said sleeve and being rotatable therewith for rotating the latter to raise and lower said cultivators on both sides of said tractor, a third arm rotatably mounted on said beam, resilient means connecting said second arm and said third arm together for yieldingly transmitting the rotation of said second arm to said third arm when said cultivators are urged into said trailing positions, and means connected to said third arm for rotating the latter and said second arm.

5. In a tractor mounted cultivator of the type employing cultivators suspended on a tool bar which can be raised and lowered, the combination of a beam rotatably mounted on said tractor and extending transverse to said tractor for supporting said cultivators to the side of said tractor, a sleeve rotatably telescoped over each end of said beam, a lift arm attached to each said sleeve for rotation therewith, a torque tube telescoped inside said beam and being rotatable therewithin and being connected to each said sleeve for transmitting the rotation of one of the other, a second arm connected to one of said sleeves, a hydraulic cylinder connected to said second arm for rotating said tube for raising and lowering said cultivators, a hydraulic valve connected to said cylinder, a control assembly interconnecting the hydraulic valve and cylinder including a control lever pivotal on said valve for movement from a neutral position to a cultivator raising position and to a cultivator lowering position, a first control rod connected to said second arm for displacement therewith, a second control rod connected to said lever for displacement therewith, said control rods being inter-engaged by means of a lost motion connection and said displacements of said rods being in opposite directions during both the raising and the lowering of said cultivators, said control assembly being arranged to return said control lever to neutral from both said raising position and said lowering position.

6. In a tractor mounted cultivator of the type employing cultivators suspended on a tool bar which can be raised and lowered, the combination of a beam rotatably mounted on said tractor and extending transverse to said tractor for supporting said cultivators to the side of said tractor, a sleeve rotatably telescoped over each end of said beam, a lift arm attached to each said sleeve for rotation therewith, a torque tube telescoped inside said beam and being rotatable therewithin and being connected to each said sleeve for transmitting the rotation of one to the other, a second arm connected to one of said sleeves, a hydraulic cylinder connected to said second arm for rotating said tube for raising and lowering said cultivators, a hydraulic valve connected to said cylinder, a control lever pivotal on said valve for movement from a neutral position to a cultivator raising position and to a cultivator lowering position, a first control rod connected to said arm for displacement therewith parallel to a side of said tractor, a second control rod connected to said lever for displacement therewith parallel to said side of said tractor and extending beyond an end of said first control rod, said control rods being inter-engaged by means of a pair of collars spaced apart on one rod and an eyelet on the other rod with said eyelet disposed between said collars and engaged with said one rod, said displacements of said rods being in directions opposite to each other during both the raising and the lowering of said cultivators for engagement of said collars and said eyelet to return said control lever to neutral from both said raising position and said lowering position.

7. In a tractor mounted cultivator of the type employing cultivators suspended on a tool bar which is raised and lowered, the combination of a torque tube rotatably mounted on said tractor and extending thereacross to opposite sides of said tractor for supporting said cultivators on each side of said tractor, a lift arm mounted on each end of said tube with one said arm being rotatably fixed to said tube and the other said arm being rotatable on said tube, a bracket attached to said tube adjacent said other arm and being rotatably fixed to said tube, said bracket and said other arm both having a slot therein disposed oblique and registered to each other, and a bolt received in each said slot for securing said bracket and said other arm in selected positions for rotationally setting said other arm with respect to said tube, and means for rotating said tube for raising and lowering said cultivators.

8. A tractor mounted cultivator comprising a member rotatably attached to said tractor and extending transverse thereto, a lift arm attached to said member for rotation therewith and projecting rearward of said tractor, cultivators connected to said lift arm and disposed in trailing positions with respect to said member and the forward motion of said tractor, a second arm connected to said member and being rotatable therewith for rotating the latter and said lift arm to raise and lower said cultivators, a third arm rotatably mounted on said tractor, a hydraulic cylinder connected to said third arm for rotating the latter, a push rod connected to said third arm and extending beyond said second arm, a trunnion on said second arm for slidably receiving said push rod intermediate the ends thereof, a pair of collars disposed on said push rod on opposite sides of said trunnion, and a spring disposed on said push rod between said trunnion and the one of said collars at the extended end of said push rod for yieldingly urging said trunnion against the other of said collars and thereby yieldingly urging said lift arm and said cultivators into a cultivating position.

9. A tractor mounted cultivator comprising a member rotatably attached to said tractor and extending transverse thereto, a lift arm attached to said member for rotation therewith and projecting rearward of said tractor, cultivators connected to said lift arm and disposed in trailing positions with respect to said member and the forward motion of said tractor, a second arm connected to said member and being rotatable therewith for rotating the latter and said lift arm to raise and lower said cultivators, a third arm rotatably mounted on said tractor, a hydraulic cylinder connected to said third arm for rotating the latter, a push rod connected to said third arm and extending beyond said second arm and away from said cylinder, a trunnion on said second arm for slidably receiving said push rod intermediate the ends thereof, a pair of collars disposed on said push rod on opposite sides of said trunnion, means securing said collars in selected positions along said push rod, and a spring disposed on said push rod between said trunnion and the one of said collars at the extended end of said push rod for yieldingly forcing said trunnion against the other of said collars and thereby yieldingly urging said lift arm and said cultivators into a cultivating position determined by the positioning of said collars along said push rod.

10. In a tractor mounted cultivator of the type employing cultivators suspended on a tool bar which can be raised and lowered, the combination of a beam rotatably mounted on said tractor and extending transverse to said tractor for supporting said cultivators to the side of said tractor, a lift arm attached to said beam for rotation therewith, a hydraulic cylinder connected to said arm for rotating said beam for raising and lowering said cultivators, a hydraulic valve connected to said cylinder, a control lever pivotal on said valve for movement from a neutral position to a cultivator raising position and to a cultivator lowering position, a first control rod connected to said arm for displacement therewith, a second control rod connected to said lever for displacement therewith, said control rods being interengaged by means of a lost motion connection and said displacements of said rods being in opposite directions during both the raising and the lowering of said cultivators, means in said lost motion connection for governing the limits of the lost motion between said rods to return said control lever to neutral from both said raising position and said lowering position at selected times and thereby govern the elevation of the raised and the lowered position of said cultivators.

References Cited in the file of this patent

UNITED STATES PATENTS

| 1,819,679 | Graham | Aug. 18, 1931 |
| 2,221,332 | Sibel | Nov. 12, 1940 |
| 2,309,221 | Smith | Jan. 26, 1943 |
| 2,332,616 | Tuft | Oct. 26, 1943 |
| 2,682,820 | Ludema | July 6, 1954 |

UNITED STATES PATENT OFFICE
CERTIFICATION OF CORRECTION

Patent No. 2,966,220                December 27, 1960

Philip D. Wenzel

It is hereby certified that error appears in the above numbered patent requiring correction and that the said Letters Patent should read as corrected below.

Column 4, line 67, for "of", second occurrence, read -- to --.

Signed and sealed this 16th day of May 1961.

(SEAL)
Attest:
ERNEST W. SWIDER
Attesting Officer

DAVID L. LADD
Commissioner of Patents